Patented Aug. 2, 1949

2,477,704

UNITED STATES PATENT OFFICE 2,477,704

METHOD FOR THE PREPARATION OF ALKYL AND CYCLOALKYL SILICON FLUORIDES

Frank J. Sowa, Cranford, N. J.

No Drawing. Application January 27, 1947,
Serial No. 724,716

12 Claims. (Cl. 260—448.2)

This invention relates to a method for the preparation of alkyl silicon fluorides and cycloalkyl silicon fluorides.

The alkyl silicon fluorides are compounds having a variety of properties and uses. Thus, the mono- and dialkyl silicon fluorides and the lower trialkyl silicon fluorides may be hydrolyzed and condensed, in accordance with procedures which are well understood in the art, to prepare materials which are useful as film-formers, lubricants, hydraulic fluids, etc. The higher trialkyl silicon fluorides are either very difficult or impossible to hydrolyze under even very drastic conditions, and hence are useful ingredients of stable lubricating compositions and actuating fluids. Similar observations apply with respect to the cycloalkyl silicon fluorides, i. e., silicon fluorides having attached to the silicon atoms residues of saturated alicyclic hydrocarbons obtained by the removal of an atom of hydrogen from such hydrocarbons. Thus, the silicon fluorides having one or two such residues per silicon atom may be hydrolyzed and condensed to form polymers which are useful as film-formers, lubricants, hydraulic fluids, etc., whereas the silicon fluorides having three such residues per silicon atom resist drastic hydrolysis, thus making them useful ingredients of stable lubricating compositions and actuating fluids.

A conventional method is known for the preparation of alkyl and cycloalkyl silicon fluorides by the Grignard reaction, viz., the reaction of silicon tetrafluoride with an ether solution of an alkyl or cycloalkyl magnesium halide. This method is not an entirely satisfactory one, however, because of the limited solubility of silicon tetrafluoride in ether and other organic solvents. As a result, it is necessary to add the silicon tetrafluoride to the Grignard reagent, this procedure giving rise primarily to trialkyl or tricycloalkyl silicon fluorides and tetralkyl silanes or tetracycloalkyl silanes, which may not necessarily be the products desired. An analogous method is known for the preparation of alkyl or cycloalkyl silicon chlorides by the reaction of silicon tetrachloride with an ether solution of an alkyl or cycloalkyl magnesium halide. Alkyl (or cycloalkyl) silicon fluorides and alkyl (or cycloalkyl) silicon chlorides are, however, not equivalent materials for all purposes. For example, in the treatment of a cotton textile, the foregoing silicon fluorides produce much less tenderizing of the fabric than do the corresponding foregoing silicon chlorides. Furthermore, the foregoing silicon fluorides hydrolyze less readily than the corresponding foregoing silicon chlorides, and, hence, the hydrolysis of the former can be more easily controlled, assuming that they can be hydrolyzed.

Alkyl and cycloalkyl silicon alkoxy compounds are also suitable for the production of polymers which are useful film-formers, lubricants, hydraulic fluids, etc. These materials, too, are customarily made by the reaction of an alkyl orthosilicate with an ether solution of an alkyl or cycloalkyl magnesium halide. This method, however, results in the production of a mixture of alkyl or cycloalkyl silicon alkoxy compounds, many of which are difficult to separate in a highly pure condition because of their relatively close boiling points. On the other hand, because of the greater differences of their boiling points, the corresponding silicon fluorides are more easily purified. Furthermore, the silicon fluorides have lower boiling points than the corresponding chlorides or alkoxy compounds, and hence are more easily distilled and lend themselves more readily to gaseous phase applications.

In view, therefore, of the limitations of the known method for the preparation of alkyl and cycloalkyl silicon fluorides, of the undesirable properties of the alkyl and cycloalkyl silicon chlorides in comparison with the properties of the alkyl and cycloalkyl silicon fluorides, and of the difficulty of purifying many mixtures of alkyl and cycloalkyl silicon alkoxy compounds produced by reacting an alkyl orthosilicate and an alkyl or cycloalkyl magnesium halide, it is the object of this invention to provide a new method for the preparation of the alkyl and cycloalkyl silicon fluorides in good yield and high purity.

This object is accomplished in accordance with the method of this invention by contacting fluosulfonic acid with a compound having the generic formula $$R_nSi(OR')_{4-n}$$

in which formula R is a saturated acyclic hydrocarbon radical having from one to twelve carbon atoms or a monocycloalkyl radical having from five to eight carbon atoms in the ring and having a total of not more than twelve carbon atoms, $n$ is an integer from one to three, and R' is a saturated acyclic hydrocarbon radical having from one to five carbon atoms.

The following examples illustrate the method of this invention for the preparation of alkyl and cycloalkyl silicon fluorides.

Example I

A sample of monobutyl-triethoxysilane was prepared in the conventional manner by the reaction of n-butyl magnesium bromide with ethyl orthosilicate. The sample of n-butyl triethoxysilane thus produced had a boiling range of 190–195° C. at atmospheric pressure, a specific gravity at 20° C. of 0.873, and an $n_D$ at 20° C. of 1.4044. One mol of this material was placed in a three-necked flask equipped with a dropping funnel, a reflux condenser, and a mechanical stirrer, and 3 mols of concentrated fluosulfonic acid (specific gravity of 1.743 at 15.6° C.) was added dropwise from the dropping funnel with stirring. In view of the fact that the reaction was extremely exothermic, the temperature of the mixture in the reaction flask was held at −30° F. by means of a Dry Ice, acetone bath. After the addition of the fluosulfonic acid had been completed, there remained a single layer in the reaction flask, from which the product was distilled directly at atmospheric pressure with fractionation. An 83% yield of mono-n-butyl trifluorosilane was obtained having a boiling range of 50–52° C. at 760 mm. of mercury pressure.

*Example II*

A sample of mixed primary-amyl triethoxysilanes having a boiling range of 190–290° C. at atmospheric pressure was prepared in the usual manner by reacting a sample of mixed primary-amylchlorides (boiling range, 90–180° C.) with magnesium and ethyl silicate. One mol of this material was placed in a three-necked flask equipped with a dropping funnel, a reflux condenser, and a mechanical stirrer, and three mols of fluosulfonic acid (specific gravity of 1.743 at 15.6° C.) was added dropwise with stirring. While the addition of the fluosulfonic acid was being carried out, the mixture in the reaction flask was held at room temperature. After the reaction had been completed, there was a separation of two layers, the upper of which was clear and the lower a heavy, colored liquid. The upper layer was distilled separately at atmospheric pressure with fractionation and consisted almost entirely of a mixture of mono-primary amyl trifluorosilanes having a boiling point of 73–75° C. A 73% yield of the desired product was obtained in this experiment.

*Example III*

A sample of lauryl triethoxy silane having a boiling range of 140–160° C. at 0.5–1.0 mm. of mercury pressure was prepared in the usual manner by the reaction of lauryl magnesium chloride (prepared from lauryl chloride having a boiling range of 97–100° C. at 0.5 mm. of mercury pressure) with ethyl orthosilicate. One mol of this material was placed in a three-necked flask equipped with a dropping funnel, a reflux condenser, and a mechanical stirrer, and three mols of fluosulfonic acid (the same material as was used in Examples I and II) was added dropwise with stirring. During the addition of the fluosulfonic acid, the temperature of the ingredients of the reaction flask was held at −20° F. by means of a Dry Ice acetone bath. After the completion of the reaction, two layers separated, the upper of which consisted mostly of mono-lauryl trifluorosilane. This upper layer was distilled with fractionation, giving a product having a boiling range of 101–111° C. at 3–4 mm. of mercury pressure and a specific gravity of 0.9376 at 23° C.

*Example IV*

100 gms. of 2-ethylhexyl triethoxysilane (prepared by the reaction of ethyl orthosilicate and 2 ethylhexyl magnesium chloride) was charged into a 500 cc. round-bottom, three-necked flask fitted for reflux with a mechanical stirrer, an addition funnel, and an immersion thermometer. Both the condenser and the addition funnel were fitted with calcium chloride drying tubes, and the flask was immersed in an ice-salt cooling bath. 130.3 gms. of commercial anhydrous fluosulfonic acid was placed in the addition funnel. After the contents of the flask had cooled to 5° C., the addition of the fluosulfonic acid was begun, and the rate of addition was controlled carefully so as to keep the temperature of the contents of the flask at a minimum. The addition was carried out over a period of about three hours, and during the later portion of the reaction period the temperature of the contents of the flask was permitted to rise to 60° C. After the addition of the fluosulfonic acid had been completed, the reaction mixture was stirred for one additional hour at room temperature. The reaction mixture was then transferred to a separatory funnel, and two layers separated. The almost colorless, upper layer consisted of crude product, and the very dark brown-red lower layer consisted of a mixture of unreacted fluosulfonic acid, monoethyl acid sulfate, and dissolved product. This lower layer was extracted with two 100 cc. portions of dry n-pentane, and the combined extractions and crude product were then subjected to distillation at atmospheric pressure until most of the pentane had been removed. The distillation was continued at 24 mm. of mercury pressure, and the fraction boiling at 50–54° C. was collected as the clear, colorless liquid product, mono-2-ethylhexyl trifluorosilane (70% yield).

*Example V*

A sample of monocyclohexyl-triethoxysilane was prepared in the conventional manner by the reaction of cyclohexylmagnesiumbromide with ethyl orthosilicate. The sample of monocyclohexyl-triethoxysilane thus produced had a boiling range of 233–234° C. at an absolute pressure of 763 mm. of mercury, a density at 21° C. of 0.9330 gms. per cc. and an $n_D$ at 19.5 C. of 1.4332. 150 gms. of this material was placed in a one liter flask which was equipped with a stirrer, a dropping funnel, and a reflux condenser, and which was cooled with an ice bath. 183 gms. of concentrated fluosulfonic acid was then added dropwise from the dropping funnel to the monocyclohexyl-triethoxysilane, which was vigorously stirred and maintained at a temperature of about 10° C. After the addition of the fluosulfonic acid had been completed, the reaction mixture was refluxed for 10 minutes. Two layers remained in the reaction flask, the upper layer being essentially monocyclohexyl-trifluorosilane and the lower layer being a mixture of ethylsulfonic acid and diethylsulphate and decomposition products thereof. The upper layer was separated and distilled, yielding 85 gm. of monocyclohexyl-triethoxysilane having a boiling point at atmospheric pressure of 106° C., a density at 25° C. of 1.1012, and an $n_D$ at 25° C. of 1.3680.

*Example VI*

A one liter flask (fitted with a stirrer, an addition funnel, a thermometer, and a reflux condenser fitted with a calcium chloride drying tube) was charged with 352 gms. of diethyl diethoxysilane. 400 gms. of concentrated commercial fluosulfonic acid was placed in the addition funnel and was then slowly added to the stirred diethyl diethoxysilane, which was maintained at a temperature below 25° C. by means of an ice bath. After the addition of the fluosulfonic acid had been completed, there remained in the reaction flask a clear brown homogeneous liquid. An additional 15 gms. of fluosulfonic acid was then added to the reaction mixture, which was then distilled using a small Vigreux column. The fraction boiling at 61–62° C. (103 gms.) was diethyl difluorosilane having a density at 27° C. of 0.9289 and an $n_D$ at 23° C. of 1.3393.

*Example VII*

A one liter flask fitted with a reflux condenser, a stirrer, a thermometer and an addition funnel was placed in an ice bath and charged with 232 gms. of di-n-butyl-diethoxysilane. 209 gms. of concentrated fluosulfonic acid was then added dropwise to the di-n-butyl-diethoxysilane while the temperature thereof was held at 3–10° C. The reaction mixture separated into two layers, the upper layer consisting essentially of di-n-butyl-difluorosilane. This upper layer was distilled yielding 42 gms. of di-n-butyl-difluorosilane having a boiling range of 146–155° C. at atmospheric pressure, a density at 25° C. of 0.881 gms. per cc., and an $n_D$ at 25° C. of 1.4049.

The foregoing examples illustrate the method of this invention for the preparation of alkyl silicon fluorides by contacting a suitable alkyl silicon alkoxy compound with fluosulfonic acid.

In place of the alkoxy compounds shown in the examples, there may be substituted any compound having the generic formula $$R_nSi(OR')_{4-n}$$

in which R is a saturated acyclic hydrocarbon radical having from one to twelve carbon atoms or a monocycloalkyl radical having from five to eight carbon atoms in the ring and having a total of not more than twelve carbon atoms, $n$ is an integer from one to three, and R' is a saturated acyclic hydrocarbon radical having from one to five carbon atoms. Thus, when R is an alkyl radical it may suitably be the methyl, ethyl, n-propyl, i-propyl, n-butyl, isobutyl, n-amyl, n-hexyl, etc. group. R' may be the methyl, ethyl, n-propyl, i-propyl, n-butyl, n-amyl, etc. radical. Hence, suitable specific alkyl alkoxy compounds are monomethyl trimethoxy silane, dimethyl dimethoxy silane, trimethyl monomethoxy silane, monomethyl triethoxy silane, dimethyl diethoxy silane, trimethyl monoethoxy silane, etc. When R is a monocycloalkyl radical, it may suitably be the cyclopentyl, cyclohexyl, cycloheptyl, cyclooctyl, cyclopentylmethyl, cyclohexylethyl, cycloheptyl-n-propyl, p-methylcyclohexyl, (p-methylcyclohexyl) methyl, etc. group, and suitable specific cycloalkyl alkoxy silanes which may be used as a reactant are monocyclopentyl trimethoxy silane, dicyclohexyl diethoxy silane, tricycloheptyl monomethoxy silane, cyclopentyl methyl triethoxy silane, di-(p-methylcyclohexyl)-methyl dimethoxy silane, etc.

The reaction is preferably conducted under anhydrous conditions, in order to reduce to a minimum the hydrolysis of the alkoxy compound and also of the fluoride product. Preferably, the mixture of reactants is maintained at a temperature below 10° C. while the reaction is progressing, in order that the highest yield of product may be obtained. Preferably, also, an excess of fluosulfonic acid is used, in order that the alkoxy compound may be consumed substantially completely, and thus not be present to hinder the recovery of the pure product from the reaction mixture.

As shown in the examples, the product may be recovered by simple distillation of the reaction mixture (at normal or reduced pressure) upon the completion of the reaction. Also, in the event that, upon the completion of the reaction, the reaction mixture exists as a single phase, the product may be recovered therefrom by extraction of the reaction mixture with a suitable solvent, such as the halogenated hydrocarbons (e. g., carbon tetrachloride, chloroform, ethylene dichloride, etc.) or petroleum hydrocarbons (e. g., pentane, petroleum ether, etc.), followed by fractional distillation of the solvent-silicon fluoride solution.

I claim:

1. The method of preparing a compound having the generic formula $$R_nSiF_{4-n}$$

which comprises contacting under substantially anhydrous conditions fluosulfonic acid with a compound having the generic formula $$R_nSi(OR')_{4-n}$$

where R is a saturated acyclic hydrocarbon radical having from one to twelve carbon atoms, $n$ is an integer from one to three and R' is a saturated acyclic hydrocarbon radical having from one to five carbon atoms.

2. The method of preparing a compound having the generic formula $$RSiF_3$$

which comprises contacting under substantially anhydrous conditions fluosulfonic acid with a compound having the generic formula $$RSi(OR')_3$$

where R is a saturated acyclic hydrocarbon radical having from one to twelve carbon atoms and R' is a saturated acyclic hydrocarbon radical having from one to five carbon atoms.

3. The method of preparing a compound having the generic formula $$R_2SiF_2$$

which comprises contacting under substantially anhydrous conditions fluosulfonic acid with a compound having the generic formula $$R_2Si(OR')_2$$

where R is a saturated acyclic hydrocarbon radical having from one to twelve carbon atoms and R' is a saturated acyclic hydrocarbon radical having from one to five carbon atoms.

4. The method of preparing a compound having the generic formula $$R_3SiF$$

which comprises contacting under substantially anhydrous conditions fluosulfonic acid with a compound having the generic formula $$R_3SiOR'$$

where R is a saturated acyclic hydrocarbon radical having from one to twelve carbon atoms and R' is a saturated acyclic hydrocarbon radical having from one to five carbon atoms.

5. The method of preparing a compound having the generic formula $$RSiF_3$$

which comprises contacting under substantially anhydrous conditions fluosulfonic acid with a compound having the generic formula $$RSi(OC_2H_5)_3$$

where R is a saturated acyclic hydrocarbon radical having from one to twelve carbon atoms.

6. The method of preparing a compound having the generic formula $$R_2SiF_2$$

which comprises contacting under substantially anhydrous conditions fluosulfonic acid with a compound having the generic formula $$R_2Si(OC_2H_5)_2$$

where R is a saturated acyclic hydrocarbon radical having from one to twelve carbon atoms.

7. The method of preparing a compound having the generic formula $$R_3SiF$$

which comprises contacting under substantially anhydrous conditions fluosulfonic acid with a compound having the generic formula $$R_3SiOC_2H_5$$

where R is a saturated acyclic hydrocarbon radical having from one to twelve carbon atoms.

8. The method of preparing a compound having the generic formula $$R_nSiF_{4-n}$$

which comprises contacting under substantially anhydrous conditions fluosulfonic acid with a compound having the generic formula $$R_nSi(OR')_{4-n}$$

where R is a radical selected from the group consisting of saturated acyclic hydrocarbon radicals having from one to twelve carbon atoms and monocycloalkyl radicals having from five to eight carbon atoms in the ring and having a total of not more than twelve carbon atoms, n is an integer from one to three, and R' is a saturated acyclic hydrocarbon radical having from one to five carbon atoms.

9. The method of preparing a compound having the generic formula $R_nSiF_{4-n}$ which comprises contacting under substantially anhydrous conditions and at a temperature below about 10° C. fluosulfonic acid with a compound having the generic formula $R_nSi(OR')_{4-n}$ where R is a radical selected from the group consisting of saturated acyclic hydrocarbon radicals having from one to twelve carbon atoms and monocycloalkyl radicals having from five to eight carbon atoms in the ring and having a total of not more than twelve carbon atoms, n is an integer from one to three, and R' is a saturated acyclic hydrocarbon radical having from one to five carbon atoms.

10. The method of preparing a compound having the generic formula $RSiF_3$ which comprises contacting under substantially anhydrous conditions and at a temperature below about 10° C. fluosulfonic acid with a compound having the generic formula $RSi(OC_2H_5)_3$ where R is a saturated acyclic hydrocarbon radical having from one to twelve carbon atoms.

11. The method of preparing a compound having the generic formula $R_2SiF_2$ which comprises contacting under substantially anhydrous conditions and at a temperature below about 10° C. fluosulfonic acid with a compound having the generic formula $R_2Si(OC_2H_5)_2$ where R is a saturated acyclic hydrocarbon radical having from one to twelve carbon atoms.

12. The method of preparing a compound having the generic formula $R_3SiF$ which comprises contacting under substantially anhydrous conditions and at a temperature below about 10° C. fluosulfonic acid with a compound having the generic formula $R_3SiOC_2H_5$ where R is a saturated acyclic hydrocarbon radical having from one to twelve carbon atoms.

FRANK J. SOWA.

REFERENCES CITED

The following references are of record in the file of this patent:

Medoks, "Journal of Gen. Chem." (U. S. S. R.), vol. 7 (1937), pages 2007–8.

Medoks, "Journal of Gen. Chem." (U. S. S. R.), vol. 8 (1939), pages 291–293.

Pearlson, "Jour. Amer. Chem. Soc.," vol. 67 (1945), pages 1769–1770.

Flood, "Jour. Amer. Chem. Soc.," vol. 55 (1933), pages 1735–6.

Gierut, "Jour. Am. Chem. Soc.," vol. 58 (1936), pages 897–898.

Abstracts of Medoks articles in Chem. Abs., vol. 32 (1938), pages 531 and 532).

Certificate of Correction

Patent No. 2,477,704                                                        August 2, 1949

FRANK J. SOWA

It is hereby certified that errors appear in the printed specification of the above numbered patent requiring correction as follows:

Column 3, line 24, for "190–290° C." read *190–210° C.*; line 27, for "90–180° C." read *90–108° C.*;

and that the said Letters Patent should be read with these corrections therein that the same may conform to the record of the case in the Patent Office.

Signed and sealed this 20th day of December, A. D. 1949.

[SEAL]

THOMAS F. MURPHY,
*Assistant Commissioner of Patents.*